United States Patent [19]

Bernard et al.

[11] Patent Number: 5,928,810
[45] Date of Patent: Jul. 27, 1999

[54] ELECTRODE WITH POROUS THREE-DIMENSIONAL SUPPORT

[75] Inventors: Patrick Bernard, Massy; Jean-Michel Dauchier, Martignas; Olivier Simonneau, Dourdan, all of France

[73] Assignee: Saft, Romainville, France

[21] Appl. No.: 08/982,481

[22] Filed: Dec. 2, 1997

[30] Foreign Application Priority Data

Dec. 2, 1996 [FR] France .................................. 96 14739

[51] Int. Cl.⁶ .................................................... C25B 11/12
[52] U.S. Cl. ...................... 429/235; 429/218.1; 429/219; 429/221; 429/222; 429/223; 429/224; 429/229; 429/231.8; 429/231.95; 204/284; 204/291; 204/292; 204/293; 204/294; 29/623.1; 29/623.5; 29/746; 359/196
[58] Field of Search ...................... 204/284, 291, 204/292, 293, 294; 429/218, 219, 221, 222, 223, 224, 229, 231, 235; 29/623.1, 623.5, 746; 359/196

[56] References Cited

U.S. PATENT DOCUMENTS

| | | | |
|---|---|---|---|
| 4,251,603 | 2/1981 | Matsumoto et al. ...................... 429/94 |
| 4,370,214 | 1/1983 | Kadija ....................... 204/284 |
| 4,401,519 | 8/1983 | Kadija et al. ........................... 204/284 |

*Primary Examiner*—Bruce F. Bell
*Attorney, Agent, or Firm*—Sughrue, Mion, Zinn, Macpeak & Seas, PLLC

[57] ABSTRACT

Electrode including a paste containing particles of electrochemically active material and a conductive support consisting of a three-dimensional porous material comprising strands delimiting contiguous pores communicating via passages, characterized in that the average width $\bar{L}$ in $\mu m$ of said passages is related to the average diameter $\emptyset$ in $\mu m$ of said particles by the following equation, in which W and Y are dimensionless coefficients:

$$(W \times \emptyset) + X \geq \bar{L} \geq (Y \times \emptyset) + Z$$

wherein

W=0.16
Y=1.69
X=202.4 $\mu m$ and
Z=80 $\mu m$

16 Claims, 6 Drawing Sheets

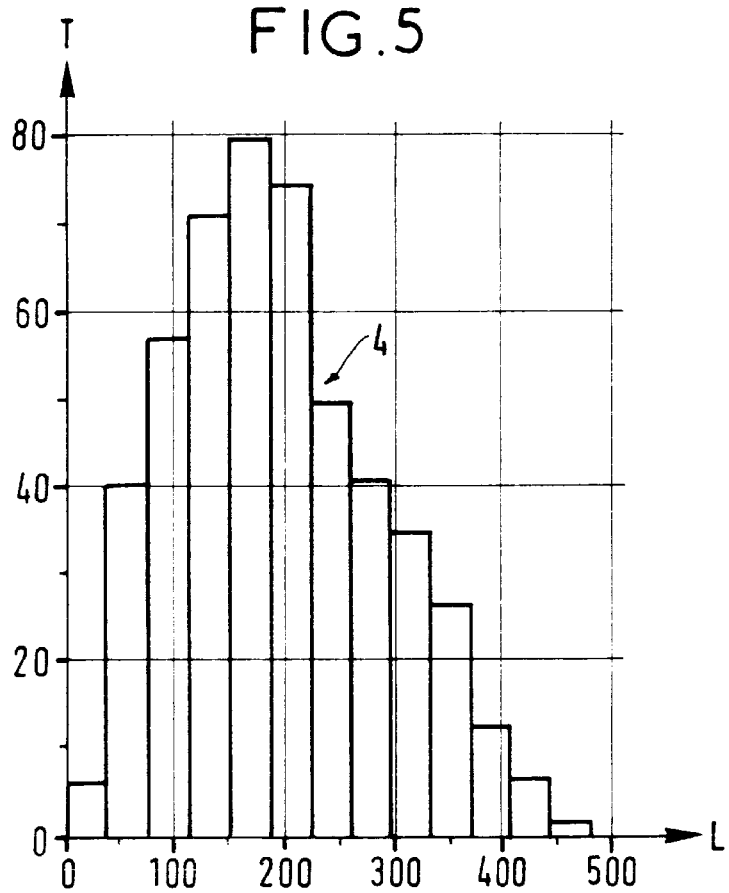
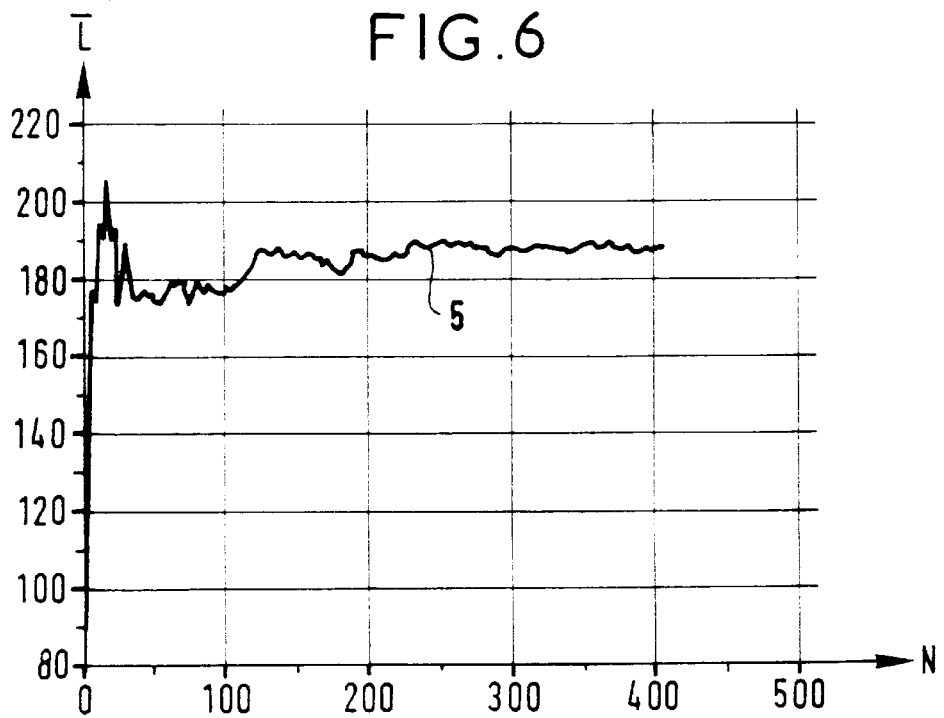

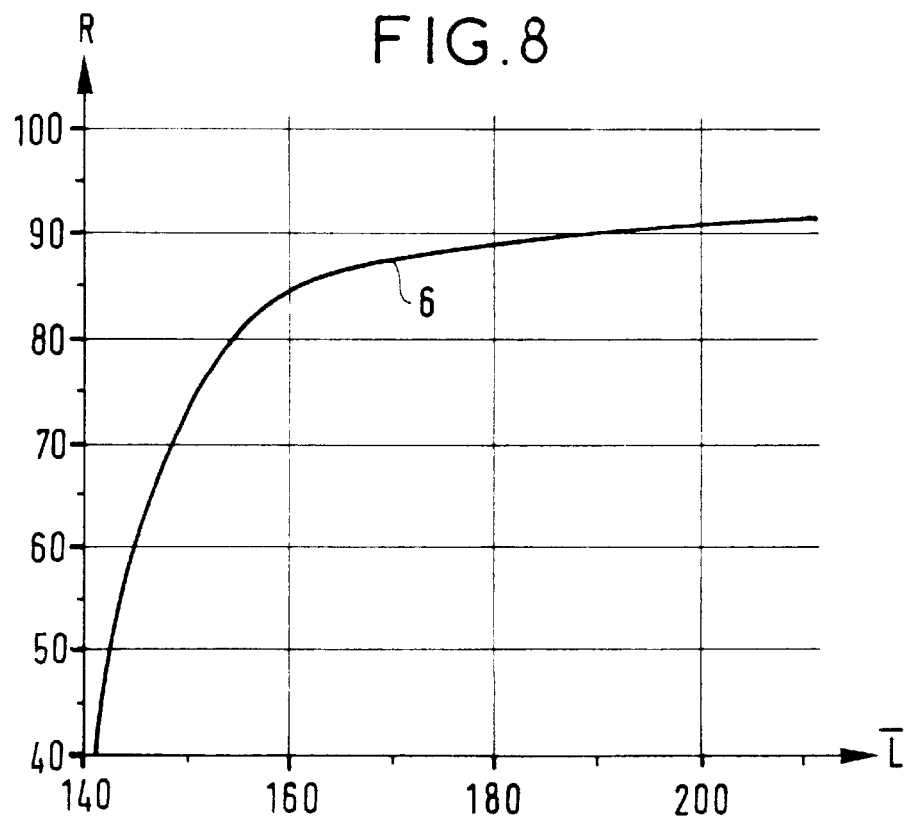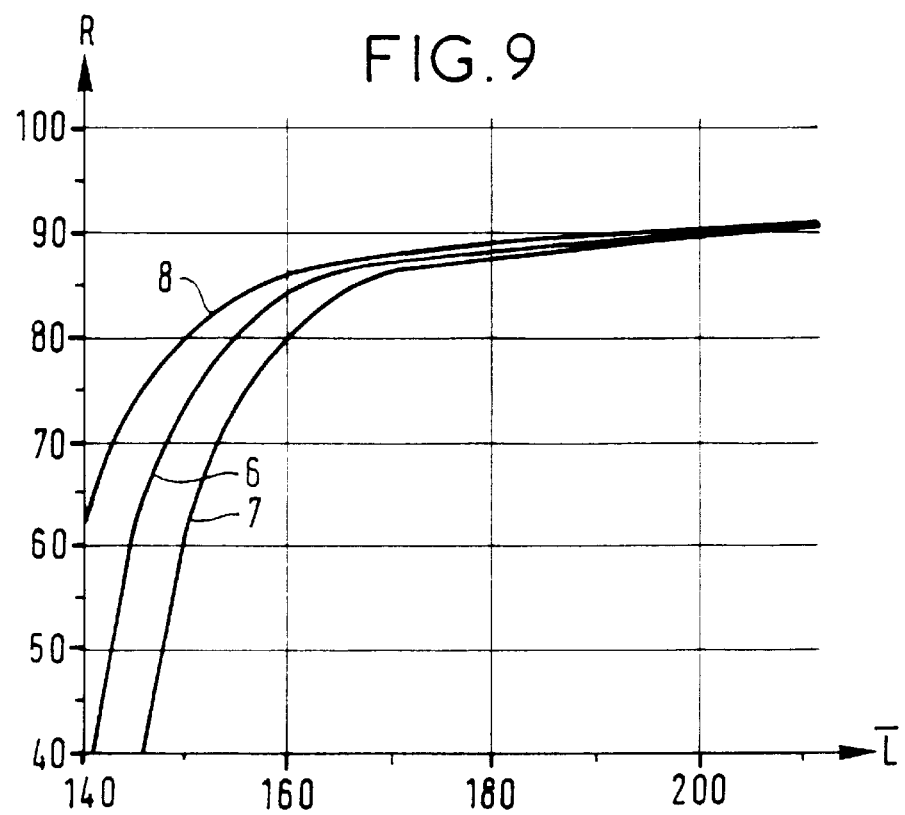

ELECTRODE WITH POROUS THREE-DIMENSIONAL SUPPORT

The present invention concerns an electrode in which the conductive support is constituted of a three-dimensional porous material and in particular a method of characterizing this material. The invention applies in particular to the sponge-like porous metal matrices frequently used as electrode supports.

Many electrodes used at present are supported by a conductive three-dimensional porous material, generally sponge-like or felt-like porous metal matrices, that simultaneously provide a structure for receiving the electrochemically active material, imparting its mechanical strength to the electrode, and a current collector. The physical parameters of this material have a direct influence on the performance of the electrode and it is therefore essential to be able to determine them precisely.

A three-dimensional porous material is constituted of a network formed by strands of material delimiting pores that communicate with each other via passages. The porous materials used commercially at present are defined by the following three parameters: the thickness, the weight per unit surface area and the number of pores per unit length (PPI: pores per inch) visible on the surface. Knowing the structure of the material, its thickness and its weight per unit surface area, it is possible to evaluate its pore volume. The PPI indicates the open porosity, and therefore the volume theoretically available to receive the electrochemically active material: this is an essential parameter for evaluating the capacity per unit volume of the electrode. In practise this latter parameter is not very reliable because it is defined imprecisely. Many manufacturers use different calculation methods to determine it. The values indicated are therefore inconsistent with each other and the user cannot use them to compare products.

Faced with this problem, manufacturers and users of these supports have tended to solve it by turning to measurement of electrical resistivity, developed surface area, head loss in a liquid or a gas medium. These methods are all far from satisfactory because each has at least one of the following drawbacks:

the method of measuring these parameters is difficult to implement, these parameters are not representative of the facility of introducing the active material, and these parameters are not representative of the electrochemical performance of the electrode obtained.

The present invention proposes an electrode having an optimized capacity per unit volume.

To avoid the drawbacks previously referred to the invention also proposes a characterization method that is easy to implement to obtain parameters representative of the capacity per unit volume of the electrode.

The present invention consists in an electrode including a paste containing particles of electrochemically active material and a conductive support consisting of a three-dimensional material comprising strands delimiting contiguous pores communicating via passages, characterized in that the average width $\bar{L}$ in $\mu$m of said passages is related to the average diameter $\emptyset$ in $\mu$m of said particles by the following equation, in which W and Y are dimensionless coefficients:

$$(W \times \emptyset) + X \geq \bar{L} \geq (Y \times \emptyset) + Z$$

wherein

W=0.16

Y=1.69

X=202.4 $\mu$m and

Z=80 $\mu$m

During the successive charging and discharging to which the electrode is subjected, periodic dimensional variations of the electrochemically active material occur that generate a pressure inside the support that can expel the active material if its particles are too small compared to the width of the communicating passages. It is therefore essential for the average width of the passages not to be too large if the active material is to be prevented from escaping during operation of the electrode.

It is also indispensable for the width of the passages to be large enough to allow penetration of the paste regardless of its composition.

The conditions referred to above depend only on the size of the particles of electrochemically active material. In this field the width of the passages is preferably as small as possible, subject to the penalty of efficiency being reduced, because the conductive network formed by the support is no longer in contact with all of the particles of active material when the width of the passages is large.

Preferably, said three-dimensional porous material has an average width $\bar{L}$ of said passages which is related to the average diameter $\phi$ of said pores by the equation:

$$\bar{L} = K \times \bar{\phi}$$

where K is a dimensionless coefficient having the value 0.45±0.06.

The above relationship enables the pore volume of the material to be filled easily and optimally.

In one preferred embodiment of the invention said conductive support is a sponge-like porous metal matrix and preferably a sponge-like porous matrix made from nickel, aluminum, copper or one of their alloys.

In another preferred embodiment, said electrochemically active material is selected from the group comprising a metal hydroxide, a metal oxide, a metal sulfide, a selenide and a carbon-containing material.

If the electrode is to be used in an alkaline electrolyte cell the active material is nickel, cadmium, iron, zinc or silver hydroxide, for example. These hydroxides may contain one or more syncrystalized metals. For example, a nickel hydroxide used as the active material usually contains cobalt, iron, aluminum, manganese, cadmium, zinc, magnesium, yttrium and/or calcium.

If the electrode is to be used in a non-aqueous electrolyte cell the active material can be a metal oxide, including an oxide of a transition metal, for example a vanadium oxide such as $V_2O_5$, a nickel oxide such as $NiO_2$, a cobalt oxide such as $CoO_2$ or a manganese oxide such as $MnO_2$.

In the case of a lithium cell the active material can be a lithium-containing metal compound selected from the group comprising a lithium-containing metal oxide such as $Li_3Cr_3O_8$ and the lithium-containing oxides of transition metals, a lithium-containing metal sulfide, for example $Li_3MoS_3$, $LiTiS_2$, $Li_3NiPS_3$ or $Li_4V_2S_5$, a lithium-containing metal selenide such as $Li_3NbSe_3$, and mixtures thereof. Compounds of molybdenum Mo, titanium Ti, chromium Cr, nickel Ni, vanadium V, manganese Mn, cobalt Co, copper Cu, iron Fe, tungsten W, niobium Nb, ruthenium Ru or iridium Ir can be used, for example.

The electrochemically active material can be a carbon-containing material selected from the group comprising graphite, coke, carbon black and vitreous carbon when the cell is a super-capacitor, for example, or a rechargeable lithium cell. In the latter case the active material of the anode can be a carbon-containing material into the structure of which lithium can be inserted.

The invention also consists in a method of characterizing a three-dimensional porous material including the following steps:

a plane surface is formed at the core of said material, said plane surface is viewed under magnification to show said strands, said pores and said passages, the width L of each of said passages is measured, and the average width $\overline{L}$ of said passages is calculated.

The width L of the passages is the shortest distance between two strands delimiting two contiguous pores. This distance is measured a large number of times so that the calculated average value is representative of the structure of the material. The average value $\overline{L}$ of the width of the passages is calculated from a sufficient number of measurements for the calculated value to be substantially constant as this number increases.

The invention further consists in a method of characterizing a three-dimensional porous material including the following steps:

a plane surface is formed at the core of said porous material, said plane surface is viewed under magnification to show said strands, said pores and said passages, the surface area S of each of said pores is measured, the diameter $\phi$ of each of said pores defined by:

$$\varphi = \sqrt{\frac{4 \times S}{\pi}}$$

is calculated, and the average diameter $\overline{\phi}$ of said pores is calculated.

Thus knowing the average diameter $\overline{\phi}$ of the pores and the average width $\overline{L}$ of the passages it is a simple matter to check if the material meets the condition for optimal filling.

The invention further consists in a method of characterizing a three-dimensional porous material including the following steps:

a plane surface is formed at the core of said material, said plane surface is viewed under magnification to show said strands, said pores and said passages, the number T of triple points per $\mu m^2$ formed by said strands is measured, and the average diameter $\overline{\phi}$ of the pores in $\mu m$ defined by:

$$\overline{\varphi} = \frac{2.54 \times 10^{+4}}{\sqrt{(0.8904 \times T^2) + (322.68 \times T)}}$$

is calculated.

Viewing the core of the porous material under magnification produces an image showing the strands. In this image, points on the skeleton of the strands are called triple points. The skeleton of any surface is defined as the set of points p of said surface such that a point Q is equidistant from two separate points $q_1$ and $q_2$ at the boundary of said surface. The majority of the points Q belonging to the skeleton, with the exception of those at the extremities, are surrounded by at least two neighboring nearer points Q. The triple points are points Q that have at least three neighboring nearer points Q (M. COSTER: "Précis d'analyse d'images", Ed. CNRS, 1985, chap. VI).

This method has the advantage of being very simple to apply and quickly yields a reliable result.

The plane surface is formed on said material by polishing as far as the required scanning plane. In most porous materials obtained by an electrolytic method pores at the surface have a smaller diameter than pores in the core of the material. In this case the removal of material by polishing is restricted to reducing the thickness of the sample by less than 10%. The aim of this operation is to expose the structural porosity of the material and to obtain a surface that can conveniently be observed at an appropriate magnification. To facilitate handling, the sample of the material is encapsulated in resin before the polishing is carried out.

For viewing the surface under the optimum conditions magnifications between 10 and 70 times are preferably used, obtainable with an electron microscope, for example. To facilitate subsequent use of this image it can be photographed. The image obtained shows strands at the periphery of the pores, each pore having passages communicating with the pores contiguous with it.

The invention further consists in a method of characterizing an electrode having this material as the conductive support.

The paste includes particles of active material, a binder and possibly a conductive material, additives and dopants; its viscosity is adjusted by adding a solvent.

A volume U of said paste is introduced into said material with pore volume V. The paste can be introduced by coating using rollers or by immersion in a bath of paste.

A ratio R by which said material, including the solvent, is filled with the paste is calculated, as defined by the equation:

$$R = \frac{U}{V} \times 100$$

The method of the present invention has the advantage of being simple to use and of yielding a reliable and reproducible value of the calculated parameter. It also indicates how easily the material can be filled with the paste.

In a preferred embodiment, the method uses a system of measuring the width of the communicating passages between contiguous pores including the following operations:

said plane surface is photographed through a microscope, preferably a scanning electron microscope, said photograph is digitized and stored in memory using a data acquisition device, said photograph is digitized and converted into a first binary image, visually corresponding, for example to an image comprising only white areas and black areas, using image analysis software, said software is then used to identify by means of a visual marker, for example by shading, all closed areas of said first image to yield a second image, these closed areas representing the strands and the white areas representing the pores of the material, said closed areas are joined by lines at the point of maximum curvature to obtain a third image, the lines representing the width of the communicating passages between the pores, said second image is subtracted from said third image to yield a fourth image on which only the lines appear, and the length of each of said lines is measured and the average value of said length is calculated.

It is possible to plot a curve of the variation in the filling ratio as a function of the average value $\overline{L}$ of the width of the communicating passages between the pores by repeating the above operations for a plurality of materials with analogous structures but with different average values $\overline{L}$ of the width of the passages and by using filling ratios determined experimentally.

In one variant, the number T of triple points of said closed areas is measured from said second image. In this way it is possible to calculate an average diameter $\overline{\phi}$ of said pores as previously defined and the processing of the image is significantly shortened.

In another variant, the surface area S of each of the areas delimited by said lines and said closed areas is measured from said third image. Each of these areas approximately corresponds to one pore. It is therefore possible to calculate an average diameter $\overline{\phi}$ of said pores from the average value of the measured surface areas S, as previously defined.

The data acquisition device preferably includes an optical system, for example an optical bench and a video camera or a scanner and a computer.

BRIEF DESCRIPTION OF DRAWINGS

The invention will be better understood and other advantages and features will emerge from a reading of the following examples which are of course given by way of non-limiting illustrative example and with reference to the accompanying drawings, in which:

FIG. 5 represents the average value of the length of the lines as a function of the number of measurements used to calculate it; the average value $\overline{L}$ in $\mu$m is plotted on the ordinate axis and the number N of measurements used to calculate this value is plotted on the abscissa axis, FIG. 6 is the histogram of the distribution of the length of each of the measured lines; the length L in $\mu$m is plotted on the abscissa axis and the number T of lines having this length is plotted on the ordinate axis, FIG. 8 is the curve showing the variation of the filling ratio as a function of the average length of the lines; the average value $\overline{L}$ in $\mu$m is plotted on the abscissa axis and the filling ratio R in % is plotted on the ordinate axis, FIG. 9 is the set of curves for the variation of the filling ratio as a function of the average length of the lines for different diameters of the active material particles; the average value $\overline{L}$ in $\mu$m is plotted on the abscissa axis and the filling ratio R in % is plotted on the ordinate axis.

EXAMPLE 1

A porous material E in the form of a sponge-like porous nickel matrix was characterized by the method of the present invention.

A sample was made and encapsulated in resin to facilitate subsequent manipulation. A piece of sponge-like porous matrix with an area of 5 cm$^2$ and a thickness of 1.6 mm was placed at the bottom of a cylindrical container and then covered with an epoxy resin. A plurality of successive degassing operations eliminated any air bubbles trapped in the resin. The resin was cured for 48 hours at room temperature. The encapsulated sample was then polished on a metallographic bench to obtain a plane surface which was washed with distilled water and then dried.

Figure 2:
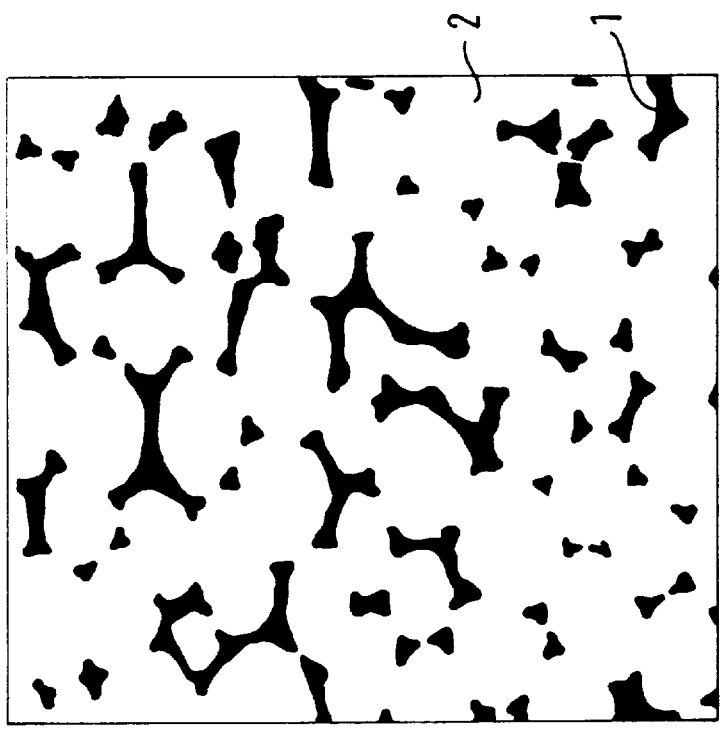
FIG. 2 shows the same image after processing to expose the strands and the pores of the material.
Figure 1:
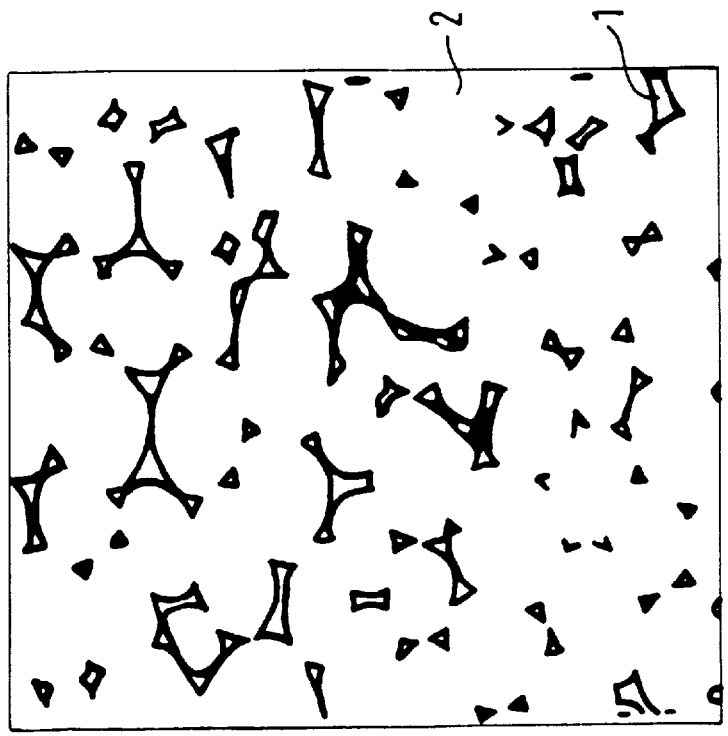
FIG. 1 shows the image of the surface of the material digitized by the method of the present invention.
Figure 4:
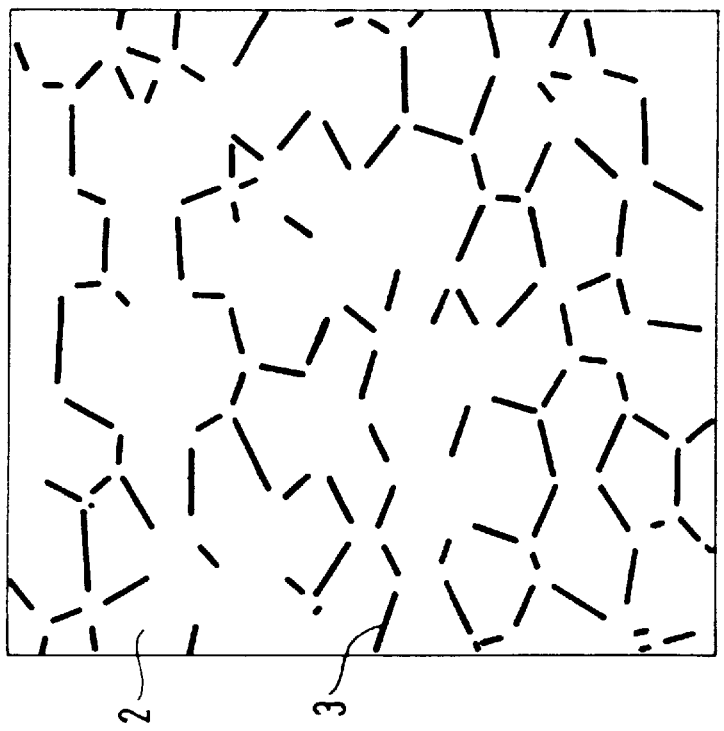
FIG. 4 shows the image obtained by subtracting FIG. 2 from FIG. 3.

This surface was then photographed with 30 times magnification using a scanning electron microscope. Six photographs of contiguous areas of the surface were obtained in this way. These photographs were digitized. FIG. 1 represents the image obtained as stored in a computer. FIG. 2 shows all the closed areas representing the nickel strands 1 filled in with black, the surface surrounding them consisting of the pores 2. The nickel strands 1 were then joined at their points of maximum curvature by lines 3 to delimit the pores 2 (see FIG. 3). Finally, the FIG. 2 image was subtracted from the FIG. 3 image to produce the FIG. 4 image showing only the lines 3 closing the pores 2 at the passages through which they communicate with each other.

The length L of each of these lines, representing the width of the passages, was measured. FIG. 5 represents the histogram 4 of the distribution of the lines of length L. The average value $\overline{L}$ was then calculated. The curve relating this average value $\overline{L}$ to the number N of measurements effected was then plotted to verify that the calculated value was representative. The curve 5 in FIG. 6 shows that the average value did not vary significantly beyond 250 measurements.

For the sponge-like porous matrix E the average value $\overline{L}$ of the width of the passages through which the pores communicate was 188 $\mu$m.

The number T of triple points identified as shown in FIG. 7 was counted on the image shown in FIG. 2. FIG. 7A represents a closed surface 11 corresponding to a strand of the sponge-like porous matrix, the skeleton 12 of which comprises a triple point 13 can be determined. FIG. 7B represents a closed surface 14 that includes two triple points 15 and 16. Similarly, the closed surface 17 of FIG. 7C includes three triple points 18, 19 and 20. FIG. 7D includes four triple points 22, 23, 24 and 25 in the closed surface 21.

The number T of triple points for the material E was 10.75 per $\mu$m$^2$. The equation previously given was applied to calculate the average diameter $\overline{\phi}$ of the pores:

$$\overline{\phi} = 2.54 \times 10^{+4} / \sqrt{[0.8904 \times (10.75)^2] + [322.68 \times 10.75]} = 425.5 \, \mu\text{m}$$

The equation $\overline{L} = K \times \overline{\phi}$ was verified for K=0.442. The results are summarized in table I below.

EXAMPLES 2 TO 6

Porous sponge-like porous nickel matrix materials A, B, C, D and F in the form of sponge-like porous nickel matrices were characterized in the manner described in Example 1. The results are summarized in Table I below.

TABLE I

| Example | 2 | 3 | 4 | 5 | 1 | 6 |
|---|---|---|---|---|---|---|
| Material | A | B | C | D | E | F |
| $\bar{L}$ (μm) | 142 | 145 | 161 | 170 | 188 | 212 |
| $\bar{O}$ (μm) | 308 | 330 | 358 | 378 | 425 | 482 |
| K = $\bar{L}/\bar{O}$ | 0.46 | 0.44 | 0.45 | 0.45 | 0.44 | 0.44 |

EXAMPLE 7

An electrode Ee in accordance with the present invention having the sponge-like porous nickel matrix E characterized in Example 1 as the support was characterized.

The electrochemically active material used was nickel hydroxide $Ni(OH)_2$ obtained by chemical precipitation by sodium hydroxide NaOH from a nickel nitrate solution. The size of the particles of nickel hydroxide was between 30 μm and 75 μm, with an average diameter Ø of 47.5 μm. The electrode containing the material E satisfied the relationship between Ø and $\bar{L}$:

$$(1.69 \times 47.5 \ \mu m) + 80 \ \mu m = 160.27 \ \mu m \leq 188 \ \mu m$$

and $$(0.16 \times 47.5 \ \mu m) + 202.4 \ \mu m = 210 \ \mu m \geq 188 \ \mu m$$

To determine the filling ratio R a paste comprising 65% nickel hydroxide powder as described above, 10% cobalt hydroxide powder and 25% of a gel made up of a cellulose-based binder in a solvent were introduced into the sponge-like porous matrix E. The filling ratio R calculated for the material E was 89%, i.e. a theoretical capacity per unit volume $C_t$ of the electrode Ee of 703 mAh/cm$^3$.

A test was conducted to verify that the active material could not escape from the pores of the material. Ten 1 dm$^2$ samples were cut out from each of the previously prepared electrodes. Each sample was weighed ($M_1$). The samples were then dropped from a height of 0.5 m onto a hard plane surface. Each sample was weighed again ($M_2$). The loss of weight $\Delta M = M_1 - M_2$ resulting from the test was then calculated for each sample, followed by the average weight loss $\Delta \bar{M}$ for the ten samples taken from the same electrodes.

The results are summarized in Table II below.

EXAMPLES 8 TO 10

Electrodes Aa, Bb and Ff that were not in accordance with the invention and having the respective sponge-like porous nickel matrices A, B and F as the support were characterized in the manner described in Example 7. The results are summarized in Table II below.

EXAMPLES 11 AND 12

Electrodes Cc and Dd in accordance with the present invention having the respective sponge-like porous nickel matrices C and D as the support were characterized in the manner described in Example 7. The results are summarized in Table II below.

TABLE II

| example | 8 | 9 | 11 | 12 | 7 | 10 |
|---|---|---|---|---|---|---|
| material | Aa | Bb | Cc | Dd | Ee | Ff |
| (W × Θ) + X ≥ $\bar{L}$ | 210 | 210 | 210 | 210 | 210 | 210 |
| $\bar{L}$ (μm) | 142 | 145 | 161 | 170 | 188 | 212 |
| (Y × Θ) + Z ≤ $\bar{L}$ | 160 | 160 | 160 | 160 | 160 | 160 |
| R (%) | 46 | 63 | 85 | 88 | 89 | 92 |
| $C_t$ (mAh/cm$^3$) | 363 | 498 | 671 | 695 | 703 | 727 |
| $\Delta \bar{M}$ (%) | 0.32 | 0.41 | 0.37 | 0.55 | 0.78 | 3.2 |

For the chosen electrochemically active material, the curve 6 in FIG. 8 shows that a satisfactory filling ratio i.e. a ratio at least equal to 85%, was obtained with a sponge-like porous matrix for which the average value $\bar{L}$ of the width of the passages through which contiguous pores communicate was at least equal to 161 μm.

A sponge-like porous matrix having an average value $\bar{L}$ less than 210 μm should be chosen so that the width of the passages is sufficiently small to prevent the hydroxide escaping during operation of the electrode. This range of values corresponds to a loss of weight of less than 1% in the test described above.

Curves 6, 7 and 8 in FIG. 9 show the variation of the filling ratio R as a function of the average value $\bar{L}$ of the width of the passages for the electrodes Aa, Bb, Cc, Dd, Ee and Ff using nickel hydroxide with an average particle diameter Ø of 47.5 μm (curve 6), 40 μm (curve 7) and 52 μm (curve 8), respectively.

If a sponge-like porous matrix in which the average width $\bar{L}$ of the passages through which two contiguous pores communicate is 161 μm (material C) is used as the electrode support, a nickel hydroxide is preferably chosen in which the particles have an average diameter less than 47.5 μm (209.6 ≥ $\bar{L}$ ≥ 156 μm) and preferably a diameter close to this value in order to benefit from a high capacity.

EXAMPLE 13

Figure 3:
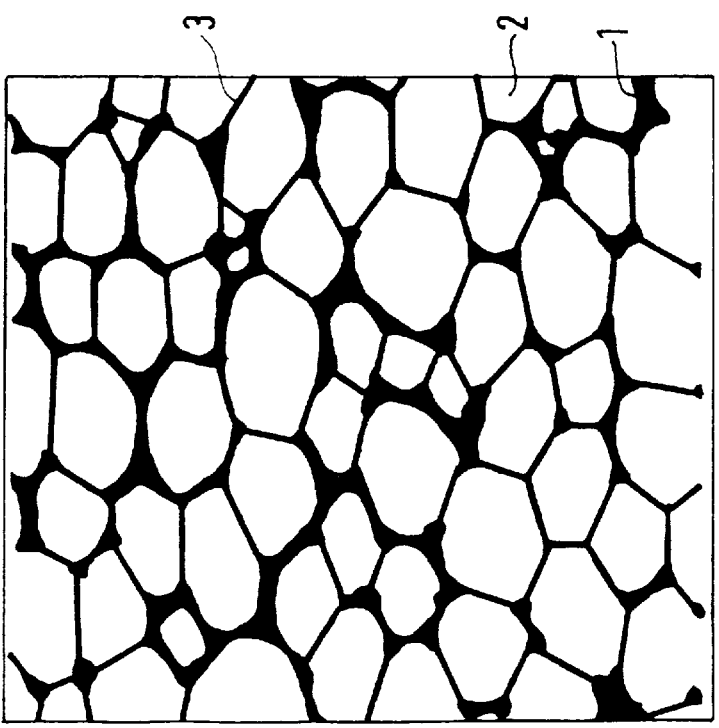
FIG. 3 shows the same image in which lines have been drawn joining the strands.
Figure 7A:
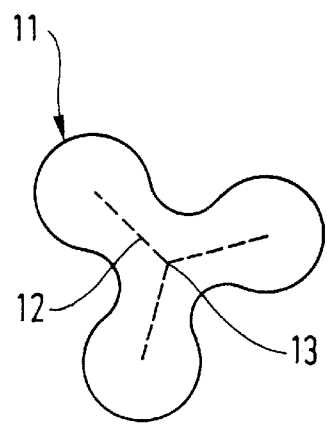
FIGS. 7A, 7B, 7C and 7D represent different configurations of triple points.
Figure 7B:
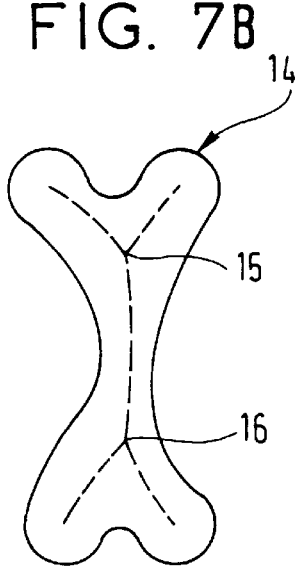
Figure 7C:
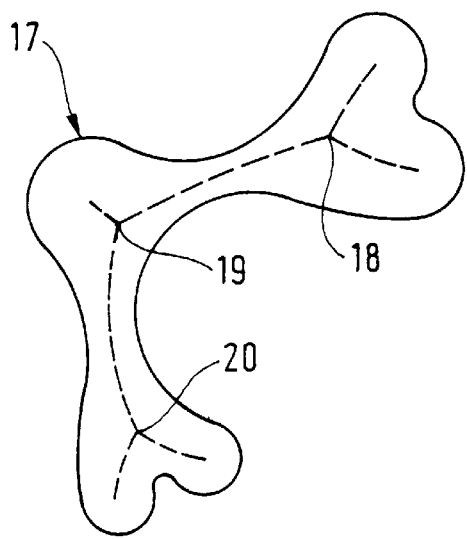
Figure 7D:
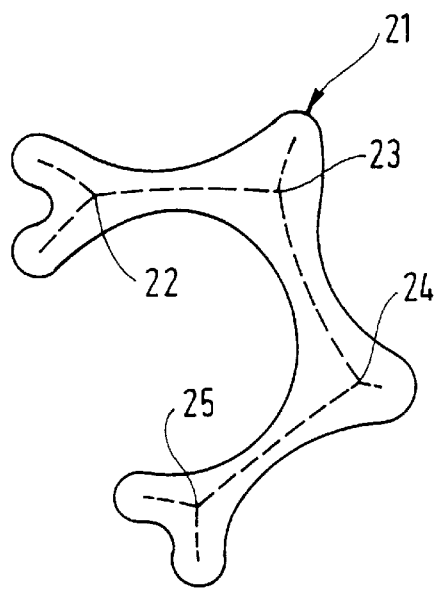
Figure 10:
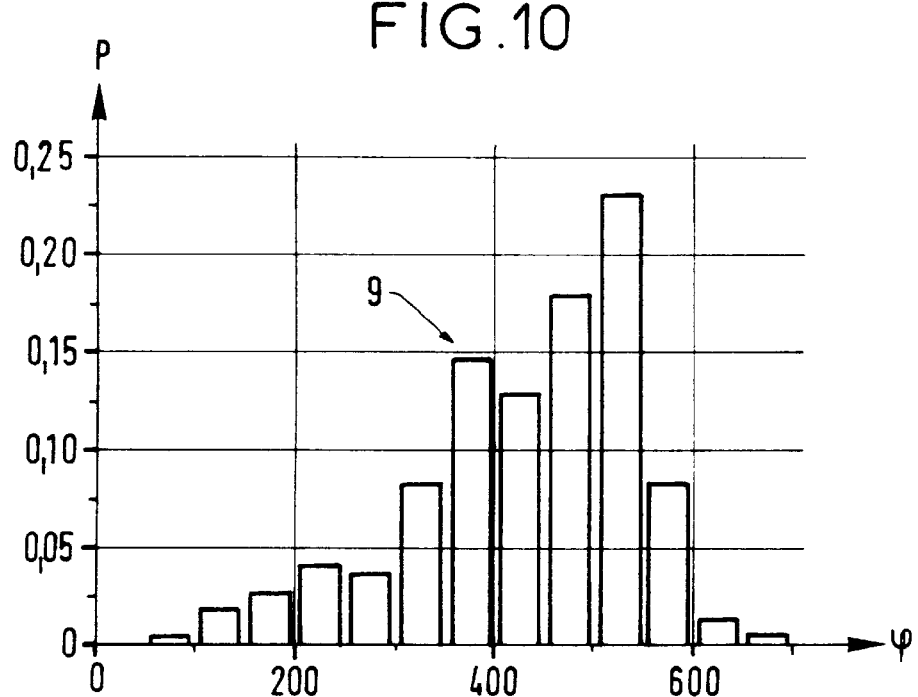
FIG. 10 represents the average diameter of the pores as a function of the number of measurements used to calculate it; the average diameter $\overline{\phi}$ in $\mu$m is plotted on the ordinate axis and the number N of measurements used to calculate this value is plotted on the abscissa axis.
Figure 11:
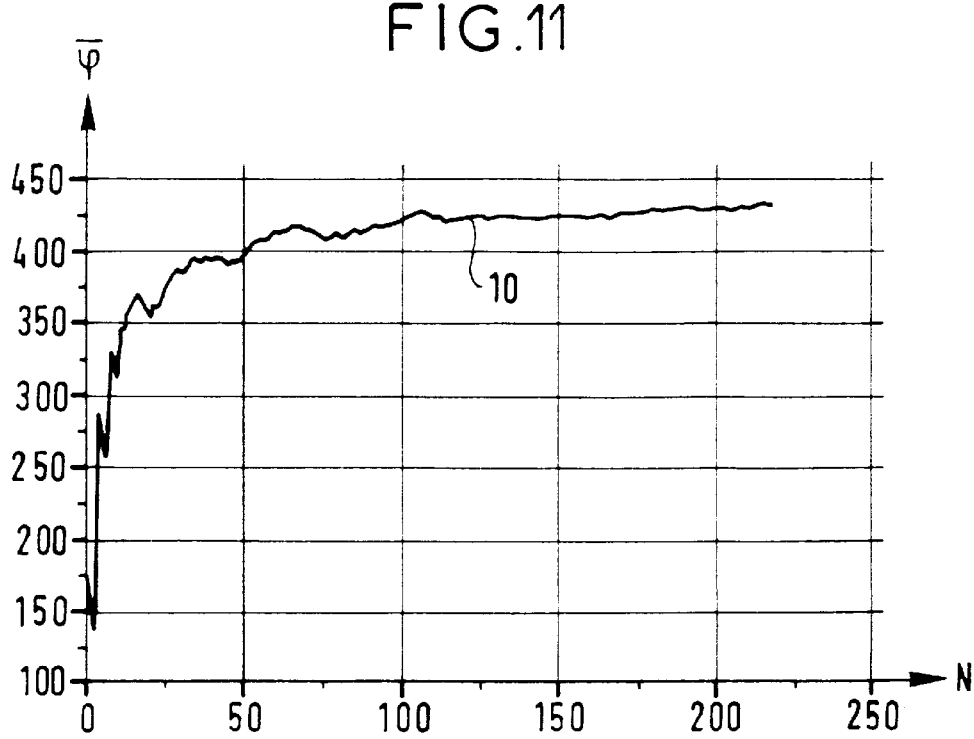
FIG. 11 is the histogram of the distribution of the diameter of each of the measured pores; the diameter $\phi$ in $\mu$m is plotted on the abscissa axis and the number P of pores having this diameter is plotted on the ordinate axis.

It is also possible to measure the diameter of the pores from the FIG. 3 image of the material E. The surface area S of each pore delimited in this way was measured. The pore was deemed to be similar to a circle and the diameter $$\varphi = \sqrt{\frac{4S}{\pi}}$$

was calculated. FIG. 10 represents the histogram 9 of the distribution of the diameter φ of the pores for the material E. The average diameter $\bar{\varphi}$ of the pores was then calculated. The curve relating this average diameter $\bar{\varphi}$ to the number N of measurements effected was then plotted to verify that the calculated value was representative. The curve 10 in FIG. 11 shows that the average value did not vary significantly above 150 measurements. The average diameter $\bar{\varphi}$ of the pores of the material E was 425 μm.

Of course, the various numerical applications provided are given by way of non-limiting example only. The present invention is open to many variants that do not depart from the scope of the invention that will be obvious to the skilled person.

We claim:

1. Electrode including a paste containing particles of electrochemically active material and a conductive support consisting of a three-dimensional porous material comprising strands delimiting contiguous pores communicating via passages, characterized in that the average width $\bar{L}$ in μm of said passages is related to the average diameter Ø in µm of said particles by the following equation, in which W and Y are dimensionless coefficients:

$$(W \times \emptyset) + X \geq \overline{L} \geq (Y \times \emptyset) + Z$$

wherein
W=0.16
Y=1.69
X=202.4 µm and
Z=80 µm.

2. Electrode according to claim 1 wherein said average width $\overline{L}$ of said passages is related to the average diameter $\overline{\phi}$ of said pores by the equation:

$$\overline{L} = K \times \overline{\phi}$$

where K is a dimensionless coefficient having the value 0.45±0.06.

3. Electrode according to claim 1 wherein said conductive support is a sponge-like porous metal matrix.

4. Electrode according to claim 3 wherein said sponge-like porous matrix is made from a metal selected from the group consisting of nickel, aluminum, copper and alloys thereof.

5. Electrode according to claim 1 wherein said electrochemically active material is selected from the group consisting of a metal hydroxide, a metal oxide, a metal sulfide, a selenide and a carbon-containing material.

6. Method of fabricating an electrode according to claim 1 including the following steps:
  a plane surface is formed at the core of a three-dimensional porous material,
  said plane surface is viewed under magnification to show said strands, said pores and said passages,
  the width L of each of said passages is measured,
  the average width $\overline{L}$ of said passages is calculated, and
  said material is chosen so that said relation between said average width $\overline{L}$ and the average diameter Ø of said particles is satisfied.

7. Method of fabricating an electrode according to claim 6 further including the following steps:
  a plane surface is formed at the core of said porous material,
  said plane surface is viewed under magnification to show said strands, said pores and said passages,
  the surface area S of each of said pores is measured,
  the diameter φ of each of said pores defined by:

$$\varphi = \sqrt{\frac{4 \times S}{\pi}}$$

is calculated,
  the average diameter $\overline{\phi}$ of said pores is calculated, and
  the relation between said average diameter $\overline{\phi}$ and the average width $\overline{L}$ of said passages is verified.

8. Method of fabricating an electrode according to 6 further including the following steps:
  a plane surface is formed at the core of said material,
  said plane surface is viewed under magnification to show said strands, said pores and said passages,
  the number T of triple points per µm² formed by said strands is measured, and the average diameter $\overline{\phi}$ of the pores in µm defined by:

$$\overline{\varphi} = \frac{2.54 \times 10^{+4}}{\sqrt{(0.8904 \times T^2) + (322.68 \times T)}}$$

is calculated, and
  the relation between said average diameter $\overline{\phi}$ and the average width $\overline{L}$ of said passages is verified.

9. Method according to claim 6 wherein said plane surface is formed by polishing said material.

10. Method according to claim 9 wherein said material is encapsulated in a hardenable resin before said polishing.

11. Method according to claim 6 wherein said magnification is between 10 times and 70 times.

12. Method according to claim 6 wherein the measurement of said average width $\overline{L}$ of said passages includes the following operations:
  said plane surface is photographed through a microscope,
  said photograph is digitized and stored in memory using a data acquisition device,
  said photograph is converted into a first binary image using image analysis software,
  said software is then used to identify by means of a visual marker all closed areas of said first image to yield a second image,
  said closed areas are joined by lines at the point of maximum curvature to obtain a third image,
  said second image is subtracted from said third image to yield a fourth image, and
  the length of each of said lines is measured and their average length and the average width $\overline{L}$ of said passages are calculated.

13. Method according to claim 12 wherein the number of triple points of said closed areas is measured from said second image.

14. Method according to claim 12 wherein the surface area of each of the areas delimited by said lines and said closed areas is measured from said third image.

15. Method of characterizing an electrode according to claim 1 wherein a ratio R of filling of said material with said paste is calculated in the following manner:
  a volume U of said paste is introduced into said material of pore volume V,
  said filling ratio R in % defined by:

$$R = \frac{U}{V} \times 100$$

is calculated.

16. A device for fabricating an electrode including a paste containing particles of electrochemically active material and a conductive support consisting of a three-dimensional porous material comprising strands delimiting contiguous pores communicating via passages, characterized in that the average width $\overline{L}$ in µm of said passages is related to the average diameter ø in µm of said particles by the following equation, in which W and Y are dimensionless coefficients:

$$(W \times \emptyset) + X \geq \overline{L} \geq (Y \times \emptyset) + Z$$

wherein
W=0.16
Y=1.69

X=202.4 µm and

Z=80 µm said device fabricating said electrode according to the steps of: forming a plane surface at the core of a three-dimensional porous material; viewing said plane surface under magnification to show said strands, said pores and said passages; measuring the width L of each of said passages is measured; calculating the average width $\overline{L}$ of said passages; and choosing said material so that said relation between said average width $\overline{L}$ and the average diameter ø of said particles is satisfied, wherein said steps of measuring and calculating comprise: photographing said plane surface through a microscope; digitizing said photograph and storing it in memory using a data acquisition device; converting said photograph into a first binary image using image analysis software; using said software to identify by means of a visual marker all closed areas of said first image to yield a second image; joining said closed areas by lines at the point of maximum curvature to obtain a third image; subtracting said second image from said third image to yield a fourth image; and measuring the length of each of said lines and calculating their average length and the average width $\overline{L}$ of said passages, and wherein said device comprises an optical system operating in conjunction with a computer.

* * * * *